United States Patent Office 3,379,786
Patented Apr. 23, 1968

3,379,786
CATALYTIC DEHYDROGENATION OF ALKYL-
AROMATIC HYDROCARBONS
Herman S. Bloch, Skokie, Ill., assignor to Universal Oil
Products Company, Des Plaines, Ill., a corporation of
Delaware
No Drawing. Filed May 11, 1966, Ser. No. 549,141
10 Claims. (Cl. 260—669)

ABSTRACT OF THE DISCLOSURE

Dehydrogenation of an alkylaromatic hydrocarbon having at least two carbon atoms in the alkyl side-chain and both alpha and beta hydrogen by contacting the alkylaromatic hydrocarbon, at a temperature of 800°–1250° F. with a catalyst composed of Pt and As on lithiated alumina.

The inventive concept described herein relates to the dehydrogenation of alkyl-substituted cyclic hydrocarbons to produce unsaturation in the alkyl side-chain. More specifically, the present invention involves a catalytic process for the dehydrogenation of an alkylaromatic hydrocarbon, producing unsaturation in the alkyl group, which process raises the degree to which equilibrium conversion can be approached without substantially decreasing the efficiency of conversion to the desired product via a multitude of side reactions, including isomerization, condensation, ring-opening, dealkylation, etc., which may take place as equilibrium is approached. Through the use of the present invention, an extended period of operation is afforded during which the catalyst utilized exhibits a high order of stability and acceptable activity as a result of decreased carbon deposition thereupon.

The process of the present invention is most advantageously applied in a process for the dehydrogenation of alkylaromatic hydrocarbons in which the alkyl side-chain contains from two to about sixteen carbon atoms and has both alpha and beta hydrogen atoms. For the purpose of providing a list of exemplary alkylaromatic hydrocarbons, ethylbenzene may be dehydrogenated to form styrene; cumene dehydrogenated to alpha-methylstyrene; ethyltoluene to methylstyrene; diethylbenzene to divinylbenzene; ethylnaphthalene dehydrogenated to form vinylnaphthalene, etc.

The uses of various dehydrogenated alkylaromatics are numerous, and applied with success in a variety of industries including the petroleum, petrochemical, heavy chemical, pharmaceutical, detergent, the plastics industry, etc. For example, styrene is utilized in the manufacture of polystyrene plastics, styrene-butadiene rubber, styrene alkyds, styrene-butadiene latex, etc. Methylstyrene, and especially alpha-methylstyrene are extensively used in polymer formation as polymerization monomers and in the synthesis of aryl-substituted polyalkyl indans, which are useful perfume intermediates; since divinylbenzene can enter two polymeric chains, an extensive use is as a cross-linking agent for polymers, and especially in polystyrene polymers, although it may be used as a monomer for drying oils, ion-exchange resins, casting resins, etc. Vinylnaphthalene is likewise useful as a monomer in copolymer compositions useful at high temperatures.

In order that a dehydrogenation process might achieve commercial success, the use of a suitable catalytic composite is required. Strictly thermal conversion of the alkyl side-chain, to the corresponding olefinic side-chain, can be carried out provided a sufficiently high temperature is utilized. However, due to high temperature pyrolysis, the main reactions are cracking, condensation and ring-opening which become undesirable from the standpoint of product quality and yield. At temperatures sufficiently low to avoid the deleterious cracking reactions, little or no dehydrogenation of the alkyl side-chain takes place. The use of suitable dehydrogenation catalysts avoids these difficulties by permitting relatively low temperature operation for dehydrogenation, while simultaneously avoiding excessive cracking. It is recognized that the prior art processes for dehydrogenation are replete with examples of numerous catalysts which can be used in promoting comparatively low temperature conversion of paraffins to olefins, which catalysts, as hereafter set forth, are generally not well-suited for alkylaromatic dehydrogenation.

These prior art catalysts generally consist of one or more metallic components from the metals of Groups VI and VIII of the Periodic Table, and compounds thereof. They are employed either unsupported, generally as a powder or small particle form, or supported or carried by a suitable refractory inorganic oxide material. Thus, suitable catalytic composites have been found to comprise one or more components selected from the group of chromium, tungsten, molybdenum, iron, cobalt, nickel, platinum, palladium, iridium, ruthenium, rhodium, osmium, and various compounds thereof. These are generally composited with a carrier material comprising one or more inorganic oxides from the group of alumina, silica, zirconia, magnesia, thoria, hafnia, titania, boria, etc. Notwithstanding the wide variety of paraffin dehydrogenation catalysts, it becomes evident, from a perusal of the prior art, that any proposed catalyst appears to possess inherently one or more drawbacks which detract from the suitability and acceptability thereof. Some catalysts are too active, to the extent that undesirable side reactions are promoted even at low temperatures. Others are too inactive at low temperatures to promote an acceptable degree of dehydrogenation. Still others are insufficiently stable to be effective for an extended period of time, and, as such, do not foster a commercially attractive process. These difficulties, attendant on the use of various catalytic composites for paraffin dehydrogenation, are magnified and multiplied when the desired process involves the dehydrogenation of alkylaromatic hydrocarbons. For example, in the dehydrogenation of isobutane, to produce isobutylene for isooctane manufacture, polymer gasoline and butyl rubber, the reaction product will contain some propylene, n-butane, butene-1, cis-butene-2 and trans-butene-2. Each of these side products has some value peculiar to its use, and, therefore, the necessity for their separation from the desired isobutylene can be at least partially justified economically. On the other hand, the dehydrogenation of alkylaromatics, such as ethylbenzene to produce styrene, will not only suffer from dealkylation whereby the ethylbenzene is converted to benzene and ethane, or to toluene and methane, but from ring-opening resulting in the destruction of the aromatic nucleus accompanied by hydrogenation to produce paraffins and isoparaffins. The formation of such by-products not only represents an appreciable economic loss, but causes problems in the recovery of high purity styrene. It is, therefore, to great advantage to effect such a dehydrogenation process in a manner which affords efficiency closely approaching 100.0%.

In conjunction with the various difficulties involved in the selection of a suitable catalyst, there is the aspect of equilibrium to consider. Dehydrogenation is generally effected at conditions including a temperature in the range of about 750° F. to about 1300° F., while the pressure is maintained from about atmospheric to about 100 p.s.i.g. The liquid hourly space velocity (defined as volumes of charge per hour, per volume of catalyst) is usually within the range of from about 1.0 to about 10.0, and hydrogen is present in an amount to result in a hydrogen to hydrocarbon mol ratio less than about 10:1. In some processes, no hydrogen is added, and steam is utilized as a diluent. When operating at or extremely close to equilibrium conversion, regardless of the character of the catalyst being used or the degree to which it successfully promotes dehydrogenation, various side reactions, including at least some cracking, are also effected. For instance, in the dehydrogenation of cumene to produce alpha-methylstyrene, at close to equilibrium conditions, a significant degree of dealkylation to benzene and propane results. This, as well as other side reactions obviously detrimentally affect the efficiency of conversion of the cumene, and tend to exert a significant adverse effect upon the economic considerations of the process.

An object of the present invention is to provide an alkylaromatic dehydrogenation process which can function at close to equilibrium without suffering from an excessive degree of side reactions leading to decreased selectivity, excessive cracking which results in the overproduction of waste gases, or the deposition of carbon onto and within the catalyst, thereby shielding the active surfaces and centers thereof from the material being processed.

Another object of the present invention is to provide an extremely efficient process for the production of styrene from ethylbenzene utilizing a particular catalytic composite at particular reaction conditions.

Therefore, in a broad embodiment, the present invention affords a process for dehydrogenating an alkylaromatic hydrocarbon, having at least two carbon atoms in the alkyl side-chain and both alpha and beta hydrogen, which process comprises contacting said alkylaromatic hydrocarbon with a catalytic composite of alkalized alumina, a Group VIII metallic component and a metallic component selected from the group consisting of the metals of Groups V-A and VI-A of the Periodic Table, having an atomic number from 33 to 52, and compounds thereof, at dehydrogenation conditions including a temperature of from about 800° F. to about 1250° F.

This process is further characterized in that a particularly preferred catalyst comprises lithiated alumina containing from about 0.10% to about 2.0% by weight of a Group VIII noble metal, and especially platinum. Although beneficial results are obtained at temperatures from about 750° F. to about 1300° F., it is preferable to operate within an intermediate temperature range of from about 800° F. to about 1250° F. The pressure will be in the range of 0 to about 100 p.s.i.g., and most normally at least about 10 p.s.i.g., but not substantially greater than about 40 p.s.i.g. The pressure will be maintained within the reaction zone by compressive hydrogen recycle in an amount such that the mol ratio of hydrogen to hydrocarbon charge is less than about 10:1, the hydrocarbon charge rate being sufficient to result in a liquid hourly space velocity (defined as volumes of hydrocarbon charge per volume of catalyst disposed in the reaction zone) of from 12.0 to about 40.0. The utilization of hydrogen in admixture with the hydrocarbon charge, has the tendency to suppress carbon deposition onto the catalytic composite. The dehydrogenation of the alkylaromatic hydrocarbon is further facilitated through the use of an inert diluent admixed with the charge stock. Suitable diluents include water, methane, argon and nitrogen which are employed in amounts within the range of about 100 p.p.m. to 100,000 p.p.m., based upon the quantity of hydrocarbon feed. Dilution of the charge stock in this manner improves the degree to which equilibrium can be approached without substantial loss in conversion activity. In one particular operation charging ethylbenzene, to produce styrene, 80.0% of equilibrium was achieved with 98.0% efficiency of conversion.

The fourth component of the catalytic composite is selected from the metals of Groups V-A and VI-A of the Periodic Table, and compounds thereof. By way of explanation, the term "Groups V-A and VI-A," in the present specification and in the appended claims, alludes to the Periodic Chart of the Elements, Fisher Scientific Company, 1953. Also, it is recognized that the elements of these groups are often referred to as "non-metallic" due to their peculiar characteristics. However, for the sake of convenience and consistency, these elements are herein referred to as "metals." Thus, the catalytic composite for use in the dehydrogenation process herein described, comprises a metallic component from the group of arsenic, antimony, selenium, tellurium and compounds thereof. Of these, arsenic and antimony are preferred, with arsenic being particularly preferred. These catalytic attenuators are employed in amounts based upon the concentration of the Group VIII metallic component, and will be present in an atomic ratio (to the Group VIII metal) within the range of from 0.1 to about 0.8. Intermediate concentrations are suitably employed such that the atomic ratio in the final catalyst is about 0.3 to about 0.5 as a preferred range. It is understood that regardless of the precise form in which the various catalytic components exist, the concentrations are calculated as if they exist within the composite as the elemental metals.

The particularly preferred dehydrogenation catalyst, employed in the process of the present invention, makes use of a non-acidic, and especially halogen-free, refractory inorganic oxide carrier material. It is understood that alumina can properly be considered, under certain circumstances, to possess acidic properties; it reacts, for example, with strong bases. However, the term "non-acidic" is intended to preclude the use of those inorganic oxides which possess the acidic function characteristic of material which fosters cracking reactions. This oxide is combined with a Group VIII noble metal component, an alkali metal component and a catalytic attenuator as above described. In some instances, the catalyst will contain an alkaline-earth metal component, including calcium, magnesium and/or strontium, although the alkali metals, cesium, rubidium, potassium, sodium and especially lithium are preferred. The Group VIII noble metals, palladium, iridium, ruthenium, rhodium, osmium, and especially platinum, may exist within the composite as the element, as a chemical compound, or in physical association with the other catalyst components. In any event, the Group VIII metal will be in an amount of from about 0.10% to about 2.0%, calculated as if it exists as the elemental metal. The alkali metals will be utilized in an amount not generally exceeding 5.0% by weight; in order to achieve a proper balance between inhibiting the occurrence of side reactions, and imparting the desired degree of stability, the alkali metals will be used in significantly lower concentrations. Therefore, they will be present in a concentration within the range of from about 0.01% to about 1.5% by weight, calculated as the element. It is preferable to utilize alumina as the carrier material, without the addition thereto of acidic components which promote hydrocracking reactions. The utilization of any other inorganic oxide, in combination with the alumina, is usually dependent upon the desire to impart thereto certain physical and/or chemical characteristics.

The catalyst for use in the present process may be prepared in any suitable manner, and it is understood that the particular method chosen is neither essential to, nor limiting upon the present invention. In general, the initial step involves the preparation of the alumina carrier material and the forming thereof into the desired size and/or shape. A suitable alumina, preferred for use as the carrier material, is one which has an apparent bulk density less than about 0.50 gram/cc., with a lower limit of about 0.15 gram/cc. The surface area characteristics will be such that the average pore diameter is about 20 to about 300 Angstroms, the pore volume is about 0.10 to about 0.80 milliliter/gram and the surface area about 100 to about 700 square meters per gram. The alkali metal, or alkaline-earth metal, is added as an aqueous solution thereof, and thus may comprise a chloride, sulfate, nitrate, acetate, carbonate, such as lithium nitrate, etc. Similarly, the platinum component or other Group VIII noble metal, may be composited in any suitable manner, one particularly convenient method involving the use of an impregnating solution of a water-soluble platinum compound such as chloroplatinic acid. The impregnated carrier is then dried at a temperature of from 100° F. to 300° F., and thereafter subjected to a calcination treatment at an elevated temperature of from 800° F. to about 1100° F.

An essential feature of the present invention involves the simultaneous use of a fourth catalytic component with, for example, the platinum and lithiated alumina. As hereinbefore set forth, this fourth component is selected from the group consisting of arsenic, antimony, selenium, tellurium and compounds thereof. Of these, arsenic appears to yield the better results in most situations, and possesses an unusual affinity for the platinum, such that it remains within the catalytic composite for an extended period of time while processing the alkylaromatic charge stock. On the other hand, selenium is probably least preferred since it appears to be most susceptible to removal from the composite during processing.

Although it can be shown that supported platinum-containing catalysts are very active in promoting the dehydrogenation of alkylaromatic hydrocarbons, they inherently possess additional, objectionable properties which stem from the overall activity and ability which platinum has for promoting other types of reactions. The alkali metal component effectively inhibits a substantial amount of the cracking reactions, by neutralizing at least a portion of the inherent acid function possessed by platinum as well as that of the support; however, sufficient cracking activity remains such that higher temperature operation to increase conversion is precluded. Furthermore, there still is present the inherent capability of the platinum to promote undesirable isomerization and dealkylation reactions. This is still further compounded by the fact that where higher temperature operation can be afforded to increase conversion without a substantial increase in cracking, there exists an accompanying increase in the tendency to promote other side reactions. Thus, at a given temperature and conversion level, the addition of lithium for the purpose of decreasing cracking activity to permit increasing temperature to increase dehydrogenation of the alkyl side-chain, falls short of economic acceptability due to the increased tendency toward hydrodealkylation and ring-opening, whereby the efficiency of conversion suffers.

The primary function of the catalytic attenuator, arsenic, antimony, tellurium and/or selenium, is actually two-fold, although the intended effect is the same. That is, the catalyst attenuator is specifically intended to poison the platinum to the extent that the remaining cracking activity thereof is virtually completely curtailed, and the tendency to promote other side reactions is substantially eliminated. The uniqueness of these attenuators resides in the fact that the dehydrogenation activity of the platinum component is not affected. The doping, or poisoning action of the attenuator is highly selective in this regard. There is actually no dehydrogenation activity supplied by the attenuator, but rather a doping or poisoning effect directed toward the specific side reactions which the platinum component is otherwise capable of promoting. In a situation where two catalysts were prepared, one with an arsenic attenuator, the other with one-half the quantity of platinum and no attenuator, the overall conversion in the case of the second catalyst decreased more than the cracking, whereas the attenuated catalyst inhibited cracking without decreasing conversion.

Another advantage of the attenuated catalyst resides in the suppression of the tendency for the constituents of the product stream to undergo polymerization, the products from which become deposited within and throughout the catalytic composite, thereby shielding the catalytically active sites from the material being processed. Through the increased efficiency of conversion to the mono-olefin, and the increased stability of the catalytic composite, the overall beneficial effect resides in the resulting economic considerations involved in the effective catalyst life and the total quantity and quality of desired product.

The attenuator, as with the lithium and platinum components, may be incorporated into the catalytic composite in any suitable manner, an especially convenient method utilizing an impregnating technique followed by drying and calcination. When the attenuator is arsenic and/or antimony, the impregnating solution may be an ammoniacal solution of the oxides thereof, such as $As_2O_5$. Oxyacids of selenium and/or tellurium form suitable impregnating solutions, and include selenious acid, tellurous acid, selenic acid and/or telluric acid, in aqueous solution. There appears to be some evidence indicating that a more favorable catalyst is produced when the platinum, lithium and the selected attenuator are impregnated in that order. The precise reason for this apparent advantage is not known with accuracy, although it is theorized that the components, including the alumina, form a peculiar complex such that additional stability is imparted.

The following examples are presented for the primary purpose of illustrating the dehydrogenation process hereinbefore described, and also to indicate the benefits derived through the utilization thereof. It is not intended to limit the scope of the invention, as defined by the appended claims, to the catalyst, operating conditions, concentrations, charge stock, etc, as used in this illustration. Modification of these variables, within the aforesaid limits, may be made by those skilled in the art of petroleum refining operations in order to achieve optimum economic advantage in a given situation.

The catalyst was disposed in a stainless steel tube of ⅞-inch nominal inside diameter, in an amount of 25 cc. The reactor was supplied with an inner spiral preheater to provide the desired operating temperature. The operating conditions included an imposed hydrogen pressure of 15.0 p.s.i.g., a liquid hourly space velocity of 32.0 (volumes of liquid charge per hour per volume of catalyst disposed in the reaction zone), a hydrogen to hydrocarbon mol ratio of 8:1, and a temperature varying from 850° F. to 1050° F. Water was utilized as a diluent in an amount of 2,000 p.p.m., based upon the hydrocarbon charge. The residence time of the reactant stream in the catalyst zone under these conditions is estimated as 0.04-0.05 second.

The catalytic composite was alumina containing 0.75% by weight of platinum and 0.50% by weight of lithium, incorporated by way of impregnating techniques using the proper quantities of chloroplatinic acid and lithium nitrate. An ammoniacal solution of $As_2O_5$ was employed in an amount to produce an atomic ratio of arsenic to platinum of 0.3:1. Following the arsenic impregnation, the composite was dried at a temperature of about 210° F. and thereafter calcined in a muffle furnace for two hours at a temperature of 932° F. It is understood that the catalyst may be made in any suitable manner, and that no particular method is either essential to, or limiting upon the present invention.

EXAMPLE I

Four operations were effected at temperatures of 850° F., 900° F., 975° F. and 1050° F., and at those conditions hereinbefore set forth. The charge stock was commercial grade ethylbenzene (above about 99.0%); an analysis of this stock indicated an actual ethylbenzene content of 99.7%. In each of the first three operations, the efficiency of conversion to styrene, or selectivity of conversion to styrene, based upon ethylbenzene disappearance, was 100.0%. In the last operation at 1050° F., there was 80.0% of equilibrium conversion, and the selectivity was 98.0%. These results are highly unusual in view of the extremely high space velocity employed.

In order to evaluate the reaction, an Arrhenius plot of the data was made. The activation energy for the reaction was shown to be 27.5 kilocalories per mol, a clear indication that the reaction was catalytic.

EXAMPLE II

The operations shown in Example I are repeated utilizing cumene (about 99.5% purity) as the charge stock. The feed is diluted as above with 2,000 p.p.m. of water. At a temperature of 1100° F., the selectivity of conversion to alpha-methylstyrene is about 95.0%. At the four lower operating temperatures of 850° F., 900° F., 975° F. and 1050° F., the selectivity ranges from 97.5% to 98.5%. At temperatures of 1050° F. and 1100° F., about 75.0% of equilibrium conversion is achieved.

The foregoing specification and examples indicate the method of effecting the highly selective dehydrogenation process of the present invention, and clearly show the benefits to be afforded as a result of the utilization thereof. Through the use of the present process, selective dehydrogenation of alkylaromatic hydrocarbons can be effected with an unusually high degree of efficiency.

I claim as my invention:

1. A process for dehydrogenating an alkylaromatic hydrocarbon, having at least two carbon atoms in the alkyl side-chain and both alpha and beta hydrogen, which comprises contacting said alkylaromatic hydrocarbon with a catalytic composite of lithiated alumina, a Group VIII metallic component and a metallic component selected from the group consisting of the metals of Groups V–A and VI–A of the Periodic Table, having an atomic number from 33 to 52, and compounds thereof, at dehydrogenation conditions including a temperature of from about 800° F. to about 1250° F.

2. The process of claim 1 further characterized in that said dehydrogenation conditions include a liquid hourly space velocity within the range of from about 12 to about 40.

3. The process of claim 1 further characterized in that said Group VIII metallic component comprises platinum.

4. The process of claim 1 further characterized in that said catalytic composite comprises from about 0.10% to about 2.0% by weight of platinum, calculated as the elemental metal.

5. The process of claim 1 further characterized in that said catalytic composite comprises alumina, 0.01% to about 1.5% by weight of lithium, 0.10% to about 2.0% by weight of platinum and a metallic component selected from the group consisting of arsenic, antimony, tellurium, selenium and mixtures thereof.

6. The process of claim 1 further characterized in that said alkylaromatic hydrocarbon is ethylbenzene.

7. The process of claim 1 further characterized in that said alkylaromatic hydrocarbon is cumene.

8. The process of claim 1 further characterized in that said alkylaromatic hydrocarbon is ethyltoluene.

9. The process of claim 1 further characterized in that said alkylaromatic hydrocarbon is ethylnaphthalene.

10. The process of claim 1 further characterized in that said catalytic composite comprises alumina, 0.01% to about 1.5% by weight of lithium, 0.10% to about 2.0% by weight of platinum, and arsenic in an atomic ratio of arsenic to platinum of from about 0.1 to about 0.8.

References Cited

UNITED STATES PATENTS

| | | | |
|---|---|---|---|
| 2,967,202 | 1/1961 | Voltz et al. | 260—669 |
| 3,293,319 | 12/1966 | Haensel et al. | 260—683.3 |
| 3,315,007 | 4/1967 | Abell et al. | 260—683.3 |

DELBERT E. GANTZ, *Primary Examiner.*

C. R. DAVIS, *Assistant Examiner.*